US005660932A

United States Patent [19]

Durston

[11] Patent Number: 5,660,932

[45] Date of Patent: Aug. 26, 1997

[54] POLYMER COMPOSITION AND ELECTRICAL WIRE INSULATION

[75] Inventor: David John Durston, Marlborough, England

[73] Assignee: Raychem Limited, United Kingdom

[21] Appl. No.: 545,833

[22] PCT Filed: May 16, 1994

[86] PCT No.: PCT/GB94/01042

§ 371 Date: Nov. 8, 1995

§ 102(e) Date: Nov. 8, 1995

[87] PCT Pub. No.: WO94/27298

PCT Pub. Date: Nov. 24, 1994

[30] Foreign Application Priority Data

May 17, 1993 [GB] United Kingdom .................... 9310146

[51] Int. Cl.[6] .............................. B32B 27/08; B32B 15/02

[52] U.S. Cl. ........................ 428/373; 427/407.1; 427/409; 428/378; 428/383; 428/389; 428/391; 522/83; 522/111; 524/436; 525/425; 525/431; 525/446

[58] Field of Search ..................................... 525/425, 431, 525/446; 524/436; 428/373, 378, 391, 389, 383; 427/407.1, 409; 522/83, 111

[56] References Cited

U.S. PATENT DOCUMENTS 4,141,927 2/1979 White .
4,657,987 4/1987 Rock ........................................ 525/531
4,816,527 3/1989 Rock ........................................ 525/531
5,095,060 3/1992 Haaf ........................................ 524/293
5,143,965 9/1992 Mertz ........................................ 524/436
5,385,970 1/1995 Gallucci et al. ......................... 524/538

FOREIGN PATENT DOCUMENTS 0 307 670 3/1989 European Pat. Off. ........ C08L 70/08
0 323 142 7/1989 European Pat. Off. ........ C08L 71/00
0 380 244 8/1990 European Pat. Off. .......... H01B 7/34
0 407 061 1/1991 European Pat. Off. .......... H01B 3/30
0 491 191 6/1992 European Pat. Off. ........ C08L 71/12
0 519 657 12/1992 European Pat. Off. ........ C08L 79/08

*Primary Examiner*—Patricia A. Short
*Attorney, Agent, or Firm*—Herbert G. Burkard; Timothy H.P. Richardson

[57] ABSTRACT

Polymer blend for insulating electrical wires comprises a first polymer (polyester) having an inherent L.O.I. not higher than 21% and up to 40% by weight of a polyimide-siloxane (PIS) copolymer. Preferred polyesters are polybutylene terephthalate or polyester-ester block copolymers. Preferred wire constructions have core insulation layer of polyethylene or polyester overlaid with jacket of the polyester/PIS copolymer blend.

12 Claims, No Drawings

POLYMER COMPOSITION AND ELECTRICAL WIRE INSULATION

BACKGROUND OF THE INVENTION

1. Field of the Invention

This invention relates to insulating polymeric compositions comprising polyimide siloxanes, especially polyetherimide siloxanes, and to electrical wire or cable provided with a layer of insulating or jacketing material formed from said compositions.

2. Introduction of the Invention

Polymeric compositions comprising polyetherimide siloxanes are known for a number of applications. EP-A-0407061, for example, describes a wire having an inner coating of a halogen free plastics material and a halogen free, hard flexible outer coating of a copolymer of, or a mixture of, a siloxane and a polyetherimide. The outer coating advantageously has the low flammability known to be associated with polyetherimides, although it is preferred to add a further outer later of poly-ether-etherketone to reduce still further the flammability and also to improve cut through and abrasion resistance and resistance to attack by fluids or gaseous chemicals. EP-A-0407061 also discloses blending unspecified amounts of polyphenylene ether or nylon with the polyetherimide-siloxane.

In another reference, EP-0307670, improved flammability is achieved by blending flame resistant polyetherimide siloxane polyetherimide copolymer blends with fluorocarbon polymers. The compositions described are particularly useful for aircraft panels and interiors. Although the materials have particularly good flame retardancy properties they do have the disadvantage of incorporating halogens, which are not desired, and indeed are often barred by legislation, for certain applications, because of the toxic nature of halogens if escaping during a fire.

EP-A-0323142 describes a ternary polymeric blend for use as wire insulation comprising a blend of polyarylene ether ketone with polyetherimide and silicone polyimide copolymer. Each of these polymeric components has excellent flame retardancy properties and the triblend similarly has excellent time retardancy. However disadvantageously all the components are expensive and the triblend similarly expensive.

Flame retardancy of polymeric compositions can conveniently be assessed by analysing the L.O.I. (Limiting Oxygen Index) of the polymers. This test is specified in ASTM D2863-1987. It determines the lowest percentage of oxygen needed to support burning of the polymer under test. A higher value of L.O.I. therefore indicates a material with higher flame retardancy. Specifically polymer compositions with a L.O.I. of at least 21% will not burn in air, and are preferred for certain applications. Where L.O.I.'s are referred to in the present invention, they are determined according to ASTM D2863-1987.

SUMMARY OF THE INVENTION

We have discovered that the flame retardancy properties of a polymer composition or blend of polymer compositions that used alone would exhibit an L.O.I less than 21% can be significantly enhanced by blending or mixing the said polymer composition or blend with a minor proportion (at most 40 weight %) of a polyimide-siloxane copolymer, preferably a polyetherimide-siloxane copolymer.

Accordingly a first aspect of the present invention provides a polymer composition having a L.O.I. of at least 27%, preferably at least 28%, more preferably at least 29% comprising a blend of (a) a first component which is a polymer or a polymer blend which polymer or blend
  (i) in the absence of any other component, would exhibit a L.O.I. of at most 21%, and
  (ii) is substantially halogen free; and
(b) at most 40% by weight (based on the overall weight of the composition) of a second component which is a polyimide-siloxane polymer, preferably a polyetherimide-siloxane polymer.

DETAILED DESCRIPTION OF THE INVENTION

Components of the composition are quantified as percentages by weight, based on the overall weight of the composition. Preferably, the composition comprises at most 35%, more preferably at most 30%, of the said second component, and may comprise at most 25 or 20% thereof.

When we say that a polymer or blend is substantially halogen free, we mean that the weight percentage of halogen in that polymer or blend is less than 0.1%, preferably less than 0.01%, especially preferably less than 0.001%.

Preferably the first component is also phosphorus-free, and/or preferably also sulphur-free. This is particularly advantageous for wire and cable insulation properties. A particularly preferred material for the first component is a polyester or a blend of polyesters. As examples there may be mentioned polyetheresters (e.g. Hytrel-5556 available from Du Pont), polyesteresters (e.g. Elastotec E-7011 available from Elastogran), polybutyleneterephthalate (e.g. Valox-325 available from General Electric) and blends of polyburyleneterephthalate and polyesteresters.

The use of polyesters as the first component is particularly preferred since inter alia the polyesters advantageously provide significantly enhanced fluid resistance, for example to hydrocarbon fluids, especially chlorinated hydrocarbon fluids, compared to the use of polyimide siloxanes (e.g. polyetherimide-siloxanes) alone, and are also significantly cheaper than polyimide siloxanes (e.g. polyetherimide-siloxanes). Polyesters, in the absence of other components typically exhibit a L.O.I of about 20%, and it is surprising that the enhanced chemical resistance can be obtained in blends where the polyester is the major component, while still achieving high flame retardancy.

As an example the use of a polyester as the major component of the composition according to the invention imparts good fluid resistance to chlorinated hydrocarbon fluids, e.g. 1,1,1, trichloroethane.

To the man skilled in the art it would not be obvious that the low flammability first component of the composition would blend effectively with the polyimide siloxane component, nor that the addition of at most 40% of the polyimide siloxane would increase the L.O.I of the overall composition to at least 27, 28 or 29%. For example, the polymer components used may not be compatible with each other, and there is no indication to the skilled man that, for example, a polyester would blend with a polyimide siloxane at the concentrations of polyimide siloxane required to give the desired flame retardancy in the overall composition. The blending achieved is particularly surprising in view of the different processing temperatures of substantially pure polyimide siloxanes (e.g. polyetherimide siloxanes typically processed at about 300° C.) and polyesters (typically processed at about 250° C.).

We have also surprisingly found that the L.O.I of a blended composition of a polyetherimide siloxane and a polyester increases substantially uniformly as the concentration of polyetherimide siloxane blended with polyester increases from 0% to 1000% polyetherimide siloxane (especially in the 0–40% range), i.e. a graph of L.O.I vs. concentration of polyetherimide is a substantially straight line rising from approximately 20% (for 100% polyester/0% polyetherimide-siloxane) to 46% (for 100% polyetherimidesiloxane/0% polyester). It is surprising that such a high increase in the L.O.I. of the polyester occurs as the polyetherimide siloxane is added, since this is not usually the case for blends of polymers with initially different L.O.I. values in which the lower-L.O.I. material is the major component.

In addition to flame retardancy, it is often desirable for polymeric compositions to exhibit good (i.e. low) smoke-release characteristics. It is known that magnesium hydroxide can act as a smoke suppressant when included in polymer compositions. However, magnesium hydroxide can not easily be included in unblended polyimide siloxanes (especially in unblended polyetherimide-siloxanes) or blends in which polyimide siloxane (especially polyetherimide-siloxane) is the significant component, since the processing temperature of polyimide siloxanes is generally too high. For example the processing temperature of polyetherimide-siloxane is about 300° C., at which temperature magnesium hydroxide is not stable. According to the present invention the first component preferably has a processing temperature of at most 270° C., more preferably at most 260° C., especially at most 250° C., and the composition preferably includes magnesium hydroxide. Preferably the percentage by weight (based on the overall weight of the composition) of magnesium hydroxide is in the range 10 to 50%, more preferably 15–40%, especially 20 to 30% or about 20%. Similarly, according to the invention, the processing temperature of the overall composition is preferably at most 270° C., preferably at most 260° C., especially at most 250° C. Even though a polyimide siloxane is one of the components of the composition and if used alone would need to be processed at higher temperatures (e.g. 300° C. for polyetherimide siloxane), the fact that it is only used as a minor component (less than 40 wt % of the overall composition) means that the overall composition can be processed at lower temperatures. By the addition of magnesium hydroxide a composition with good flame retardancy and good smoke-release characteristics is achieved.

A particularly preferred polyimide siloxane copolymer used according to the present invention is a polyetherimide siloxane, Siltem 1500 (as supplied by General Electric Plastics).

The polymer composition according to the invention is preferably electrically insulating.

The composition of the invention is particularly useful as an insulating layer on an electrical wire or cable, and a second aspect of the invention provides an electric wire or cable provided with an insulating layer of a polymer composition according to the first aspect of the invention. The layer of polymer composition may be provided as a single layer primary insulation, as the inner or outer layer of a dual wall wire construction, or, as any layer in a multi wall construction. The insulating layer may also or instead provide an insulating cable jacket to single or bundles of wires. As an example, the insulating composition may be provided on the wire by extrusion.

The invention also provides self supporting articles e.g. hollow articles such as tubular or branched moulded parts made from a composition according to the first aspect of the present invention.

The composition according to the invention is preferably cross-linkable, and may be cross-linked. Cross-linking may be achieved in a known manner using a beam of high energy electrons, or by peroxide curing. Where the composition is provided on a wire or cable, cross-linking is preferably carried out after application of the composition onto the wire or cable.

The preferred compositions wherein the first component is a polyester or blend of polyesters, especially those which are or include polyester/esters, have been found especially well suited to the many technical requirements of wire coatings and are unexpectedly convenient and economical to process.

EXAMPLE 1

A copper conductor coated with a polymer composition according to the present invention was made from the following components:

| component | wt % |
|---|---|
| VALOX 325 pellet form | 46 |
| SILTEM 1500 pellet form | 30 |
| Magnesium Hydroxide | 20 |
| STABOXOL P | 2 |
| Titanium dioxide | 2 |

VALOX 325 is a polybutylene terephthalate available from General Electric

SILTEM 1500 is a polyetherimide siloxane available from General Electric Plastics STABOXOL P is a polycarbodiimide added as a hydrolysis stabiliser, and titanium dioxide is added as a pigment The above components were dried for at least 4 hours at 120° C., and then the pellets of VALOX and SILTEM mixed together and the powdered magnesium hydroxide, STABOXOL-P and titanium dioxide similarly mixed together. The two dry mixes were then fed separately into the initial feed zone of a twin screw extruder with a maximum temperature set to 250° C. The materials were fully mixed in the extruder and the homogeneous extrudate cooled and pelletised for further processing.

The pellets obtained from the above process were dried at 120° C. for 4 hours, and introduced into a single screw extruder with a maximum set temperature of 250° C. The extrudate was drawn down onto an 18 AWG tin coated copper conductor to form an insulated wire with a thickness of insulation equal to 0.25 mm (0.01 inches) at a line speed of 20 meters per minute.

EXAMPLE 2

A polymer composition was made in a manner similar to that described in Example 1, using the following components:

| component | wt % |
|---|---|
| Elastotec E5511 | 36.63 |
| Siltem 1300 | 29.70 |
| Magnesium Hydroxide | 29.70 |
| Irganox 1010 (antioxidant) | 0.99 |
| Staboxol P | 1.98 |
| Titanium Dioxide (optional) | 1.00 |

The Elastotec material is a polyester block copolymer having polybutylene terephthalate hard blocks and polycaprolactone soft blocks, available from Elastogran GmbH, a subsidary of BASF.

EXAMPLE 3

Dual-wall wire coatings.

A. The compositions of Examples 1 and 2 respectively were extruded and drawn in a manner known per se onto a wire already carrying a 0.15 mm thick coating of high density polyethylene having the usual amounts of the usual wire coating additives such as antioxidant, metal deactivator, pigment, etc. This resulted in a wire having a primary core insulation of the HDPE and a primary jacket layer, also 0.15 mm thick, of the respective compositions of Examples 1 and 2. Such wires are very suitable for uses which do not require the jacket to be bonded to the core.

B. Part A was repeated with the HDPE core coating replaced with a similar coating based on polybutylene terephthalate. This produced wires with the jacket bonded to the core.

EXAMPLE 4

A polymer composition according to the invention was made in a manner similar to that described in Example 1, using "Armitel" (Trade Mark) UM550, a thermoplastic polyester-ester-urethane available from Akzo Plastics. The blend containing 33 parts of the Armitel UM550, 20 parts of Siltem 1300, 45 parts of magnesium hydroxide, and 2 parts of Staboxol-P, produced an L.O.I. of 31% and retained an elongation of 63% after ageing at 150° C. for 0.605 Megaseconds (168 hours=1 week) in the form of a single coating of 0.23 mm (0.009 inches) thickness on a 16 AWG wire.

The PBT/polycaprolactone polyesterester material of Example 2 is preferred since it has been found to tolerate higher loadings (e.g. above 30 wt. %) of the flame-retardant magnesium hydroxide and to resist embrittlement on ageing for 0.1908 Megaseconds (53 hours) in an oven at 180° C. This was surprising, since blends of polycaprolactone with PBT did not show such resistance to embrittlement. Polyetherester block copolymers such as "Hytrel" (Trade Mark) have also been found subject to embrittlement, and are preferably excluded from the term polyester as used herein. Preferably, the polymer composition will retain elongation in excess of 100% after ageing.

It has unexpectedly been found that co-extrusion of the core and jacket layers (instead of sequential extrusion) onto the wire improves the cut-through resistance of the insulation even when tested by the demanding "thumb-nail test". This is especially so for the preferred HDPE core layer with Example 2 jacket.

The blends of the present invention appear to produce a synergistic improvement in properties, as demonstrated, for example, by the fact that a blend of 54% PBT and 36% "Siltem" with 10% of a stabiliser masterbatch (20% "Staboxol" in "Hytrel" polymer) retains elongnation of 104% after ageing at 150° C. for 0.605 Megaseconds (168 hours=1 week), where is PBT or Siltem alone (with the same stabiliser content) each retain less than 50% elongation after similar ageing. The aforementioned "Elastotec" E5511 of Example 2 also suffers severe loss of elongation on ageing when the "Siltem" is omitted.

What is claimed is:

1. An insulated wire or cable which comprises
   (1) a wire;
   (2) a primary core insulation layer; and
   (3) overlaying the primary core insulation layer, a melt-extruded insulating jacket layer composed a polymeric composition which has a Limiting Oxygen Index of at least 28% and which comprises
      (a) a first polymeric component which
         (i) in the absence of any other component has a Limiting Oxygen Index of at most 21%,
         (ii) comprises at least one polyester which is free of halogen, phosphorus and sulfur, and
         (iii) is substantially halogen-free, and
      (b) a second polymeric component which is present in amount at most 35% by weight of the composition and which is a polyimide-siloxane polymer.

2. An insulated wire or cable according to claim 1 wherein the first polymeric component consists essentially of polybutylene terephthalate and the second polymer component consists essentially of a polyetherimide siloxane polymer.

3. An insulated wire or cable according to claim 2 wherein said insulating jacket layer contains magnesium hydroxide in amount 15 to 40%, based on the weight of the composition.

4. An insulated wire or cable according to claim 3 wherein the insulating jacket layer is composed of a polymeric composition consisting essentially of polybutylene terephthalate, polyetherimide siloxane polymer and magnesium hydroxide.

5. An insulated wire or cable according to claim 1, wherein the core layer comprises a polyolefin.

6. An insulated wire or cable according to claim 5, wherein the core layer comprises high density polyethylene.

7. An insulated wire or cable according to claim 1, wherein the core layer comprises a polyester.

8. An insulated wire or cable according to claim 7, wherein the core layer comprises polybutylene terephthalate.

9. An insulated wire or cable according to claim 1, wherein the polymeric composition of the jacket layer has been crosslinked.

10. A method of preparing an insulated wire or cable which comprises melt-coextruding over a wire first and second insulating polymeric compositions so that the second composition forms an inner layer and the first composition forms an outer layer, the first composition being melt-extruded at a temperature of at most 270° C. and comprising
   (a) a first polymeric component which (i) in the absence of any other component, has a Limiting Oxygen Index of at most 21% and (ii) is substantially halogen-free,
   (b) a second polymeric component which (i) is present in amount at most 50% by weight, based on the weight of the composition, and (ii) is a polyimidesiloxane polymer, and
   (c) magnesium hydroxide which is present in amount 15 to 40% based on the weight of the first composition;

the melt extruded first composition having a Limiting Oxygen Index of at least 27%.

11. A method according to claim 10 which comprises crosslinking the melt-extruded jacket layer.

12. A method according to claim 11, wherein the crosslinking is effected by irradiation of the layer with high energy electrons.

* * * * *

UNITED STATES PATENT AND TRADEMARK OFFICE

CERTIFICATE OF CORRECTION

PATENT NO. : 5,660,932

DATED : David John Durston

INVENTOR(S) : August 26, 1997

It is certified that error appears in the above-identified patent and that said Letters Patent is hereby corrected as shown below:

Column 1, line 43, replace "time" by --flame--.

Column 2, line 32, replace "polyburyle-" by –polybutyle—.

Column 3, line 3, replace "1000%" by –100%--.

Column 3, line 8, replace "polyetherimidesiloxane/0%" by –polyetherimide-siloxane/0%–.

Column 5, line 63, replace "where is" by --whereas--.

Claim 12, line 1, replace "11" by --9--.

Signed and Sealed this

Twentieth Day of January, 1998

Attest:

BRUCE LEHMAN

Attesting Officer

Commissioner of Patents and Trademarks